United States Patent [19]

Brännström et al.

[11] Patent Number: 5,163,384
[45] Date of Patent: Nov. 17, 1992

[54] POWER PLANT WITH A COMBUSTOR FOR COMBUSTION IN A FLUIDIZED BED

[75] Inventors: Roine Brännström, Finspong; Leopold Malmkvist, Ljusfallshammar, both of Sweden

[73] Assignee: ABB Stal AB, Sweden

[21] Appl. No.: 778,970

[22] PCT Filed: Jun. 20, 1990

[86] PCT No.: PCT/SE90/00446
§ 371 Date: Dec. 23, 1991
§ 102(e) Date: Dec. 23, 1991

[87] PCT Pub. No.: WO91/00474
PCT Pub. Date: Jan. 10, 1991

[30] Foreign Application Priority Data
Jun. 29, 1989 [SE] Sweden .................. 8902357-6

[51] Int. Cl.⁵ .................. B09B 3/00; F22B 1/00
[52] U.S. Cl. .................. 122/4 D; 60/39.464; 110/245
[58] Field of Search .............. 122/4 D; 60/39.464; 110/245; 431/7, 170

[56] References Cited
U.S. PATENT DOCUMENTS

| | | | |
|---|---|---|---|
| 4,530,207 | 7/1985 | Brannstrom | 122/4 D X |
| 4,552,078 | 11/1985 | Morin et al. | 122/4 D X |
| 4,584,949 | 4/1986 | Brannstrom | 122/4 D X |
| 4,593,630 | 6/1986 | Teigen | 122/4 D |
| 4,655,147 | 4/1987 | Brannstrom et al. | 110/263 |
| 4,767,315 | 8/1988 | Brannstrom et al. | 122/4 D |

FOREIGN PATENT DOCUMENTS
0327383 8/1989 European Pat. Off. .
2077134 12/1981 United Kingdom .

*Primary Examiner*—Edward G. Favors

[57] ABSTRACT

The invention relates to a power plant with a combustor (10) with combustion of a fuel in a fluidized bed of a particulate material and with a storage container (36) for hot bed material for adjusting the bed height upon changes of the load by the transfer of bed material from the combustor (10) to the storage container (36) and vice versa. It is primarily intended for a PFBC power plant with the combustor (10) and the container (36) in a pressure vessel (14) filled with compressed combustion air. The container (36) is provided with an internal mantle (66) which surrounds the storage space (40) for the bed material and an internal insulation (68) in the gap (70) which is formed between the container wall (36a) and the mantle (66). The lower part of the mantle (66) is joined to the container wall by means of an outwardly and upwardly directed skirt-like flange (66a-c).

6 Claims, 4 Drawing Sheets

POWER PLANT WITH A COMBUSTOR FOR COMBUSTION IN A FLUIDIZED BED

TECHNICAL FIELD

The present invention relates to a power plant comprising a combustor with a fluidized bed according to the preamble to claim 1.

The invention relates particularly to power plants of the above-mentioned kind which are working with a pressurized fluidized bed in a combustor which is placed in a pressure vessel (a PFBC plant, where "PFBC" stands for Pressurized Fluidized Bed Combustion).

In a PFBC plant a gas and a steam cycle are often combined. Both propellent gas for the gas turbines and steam for the steam turbines are generated in a common combustor. The total efficiency can be increased and solid fuels may advantageously be burnt. In addition, environmentally harmful products, for example sulphur, can be efficiently absorbed.

The bed height must be adjusted to obtain the desired output power. Bed material must thereby be removed from or supplied to the combustor. Because of its high temperature, 750–900° C., and other properties, the handling of the bed material involves problems which are difficult to solve.

BACKGROUND ART

The above problems and the state of the art as regards means for handling bed material in plants with a combustor with a fluidized bed are described in detail in a report, ANL/CEN/FE-81-3 from Argonne National Laboratory, Argonne, Il., entitled "Discharge and Handling of Solids from Pressurized Fluidized Bed Combustors" by John E Hanway Jr. and W. F. Podolski.

From DE-C-948 105 a combustion plant with a fluidized bed is known, in which the bed material is constantly discharged from and returned to the fluidized bed. The discharged bed material from the fluidized bed is brought, in a conduit, into contact with a relatively cold compressed gas, which absorbs heat from the bed material In a cyclone the bed material is separated from the gas. The bed material is returned to the fluidized bed, whereas the gas is mixed with the combustion gases from the fluidized bed and supplied to a gas turbine. In this way, the temperature of the gases flowing into the turbine is controlled. The method is not utilized for power control in the combustion plant with the fluidized bed, and the quantity of bed material present in the fluidized bed is constant practically all the time.

In European patent application 84104821.8, publication number 0 124 842, a further power plant of the kind in question is described.

SUMMARY OF THE INVENTION

The object of the invention is to improve a power plant of the kind described in the above-mentioned European patent application so that, in storage containers for hot bed material, container walls which are subjected to great stresses and require a large quantity of material may be designed from simple, relatively inexpensive construction materials. One condition for this is that the wall temperature is low and considerably lower than the temperature of the material to be stored.

To solve the above task, a power plant according to the preamble to claim 1 is proposed, which, according to the invention, has the characteristic features stated in the characterizing part of claim 1.

According to the invention, the plant is designed with a storage container with an internal insulation with ceramic insulating material in a gap between the container wall and an inner mantle. Within this mantle, the hot bed material is stored. For the mantle a heat-resistant, high-temperature material must be used. Because the container wall and the mantle consist of materials having different coefficients of thermal expansion and are heated to different temperatures, the cylinder and the mantle are expanded to different degrees. Further, at one end, suitably the lower end, the mantle must be gas-tightly connected to the outer wall of the container so that gas is prevented from circulating between the space inside the mantle and in the gap between the container wall and the mantle. Such a circulation may entail a harmful local heating and thermal asymmetry in the container wall, damage to the insulating material and transport of bed material into a gap between the mantle and the insulation, which gap is necessary in order for the insulation not to be subjected to press damage when the mantle expands upon heating The expansion problems upon heating are overcome by providing the mantle, at its lower part, with an outwardly and upwardly directed collar or skirt which, at its outermost part, is gas-tightly connected by means of welding to the container wall. The insulation inside the space between the container wall and the mantle and the insulation of cold bed material at the mantle and the coller entail a successively decreasing temperature between the cylindrical part of the mantle and the container wall, which reduces the stresses in the conical collar or the flange to tolerable values. An axial extension of the flange influences the magnitude of the stresses. The conical collar or flange is made of several materials. Nearest the cylindrical part of the mantle there is suitably used a material having properties similar to those used therein. Nearest the container wall there is suitably used a material having properties similar to those used therein. The collar also centers the mantle in the container.

BRIEF DESCRIPTION OF THE DRAWINGS

The invention will be described in greater detail with reference to the accompanying drawings.

DESCRIPTION OF THE PREFERRED EMBODIMENTS

Figure 1:
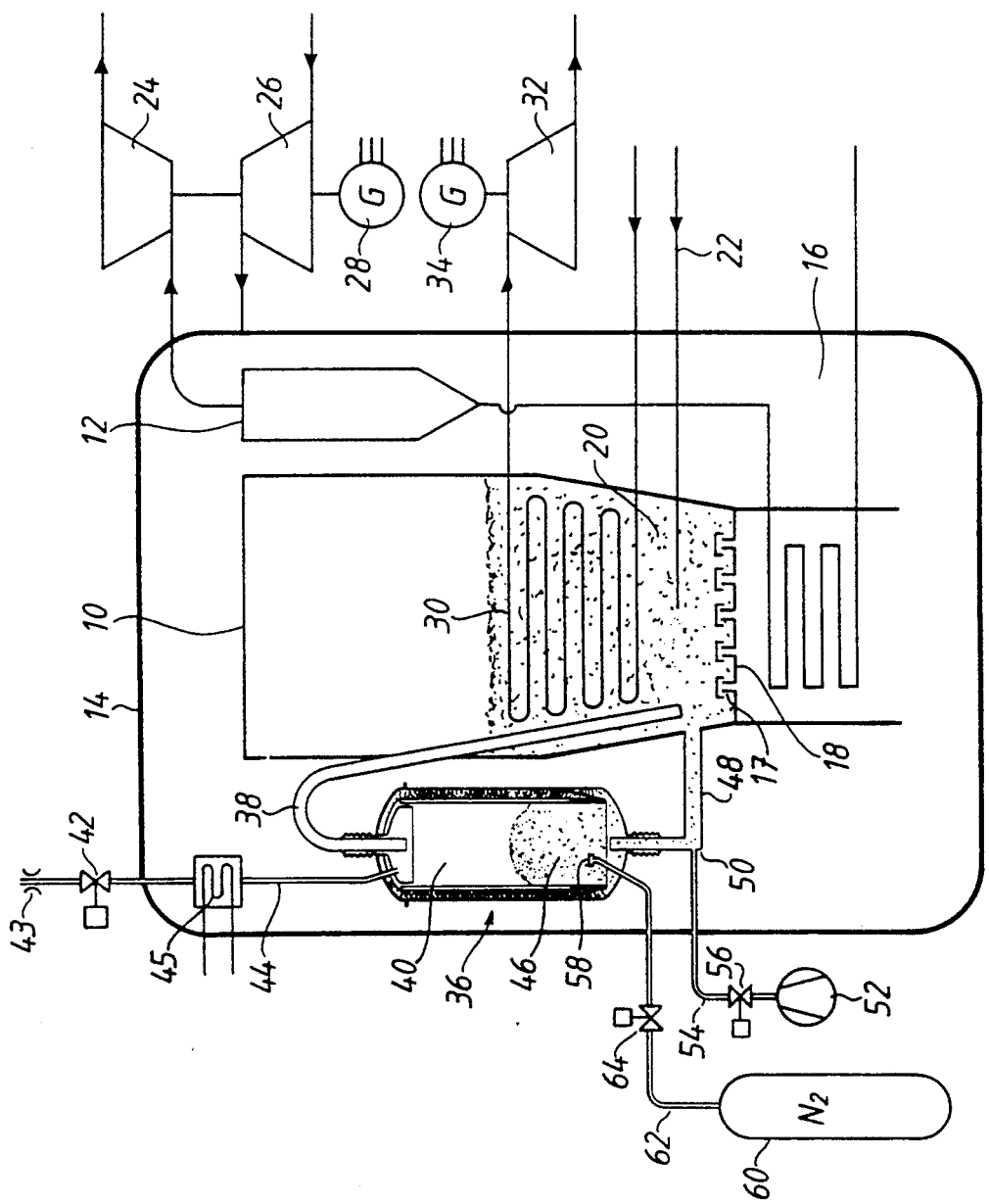
FIG. 1 schematically shows a PFBC power plant.

In the figures, 10 designates a combustor and 12 a cleaning plant symbolized by a cyclone. These units are enclosed within a pressure vessel 14. In the space 16 between the pressure vessel 14 and the combustor 10 there is compressed combustion air which is supplied to the combustor via nozzles 17 in the bottom 18 thereof. The air fluidizes a bed 20 of particulate material and burns a fuel which is supplied to the combustor 10 via the inlet conduit 22. The bed 20 contains material with the ability to absorb sulphur, such as lime or dolomite. Combustion gases generated in the combustor are supplied to the gas turbine 24 after cleaning in a cleaning plant 12. This turbine 24 drives a compressor 26 which compresses combustion air supplied to the space 16 in the pressure vessel 14 and the generator 28. The combustor 10 comprises tubes 30 which discharge heat from the bed 20 and generate steam for driving the steam turbine 32 and the generator 34 connected to the turbine 32.

When controlling the power of the plant, the height of the bed 20 is varied. In order to maintain, upon power reduction, a temperature in the bed which is sufficiently high for combustion, the bed height is reduced so that some of the tubes 30 are exposed and the heat absorption thereof is reduced. Upon power increase, the bed height is increased.

Upon a change in power, bed material is transferred between the combustor 10 and a number of insulated storage containers 36 arranged inside or outside the pressure vessel 14. The transfer of bed material from the combustor 10 to the container 36 through the conduit 38 is brought about by reducing the pressure in the space 40 in the container 36 so as to obtain a pressure difference between the combustor 10 and the container 36 which is necessary for the transport. This reduction of pressure is achieved by opening the valve 42 in the conduit 44 and removing gas from the space 40. Suitably, a gas flow-limiting throttle means 43 is placed downstream of and a gas cooler 45 placed upstream of the valve 42. In this way the gas speed in the valve and the heating of the valve are reduced, and hence the stresses on the valve are reduced. The transfer of bed material from the combustor 10 to the container 36 takes place in lean phase. The return of bed material 46 in the container to the combustor 10 upon a power increase takes place through the conduit 48 with the L-valve 50. The return through the conduit 48 takes place in dense phase. Propellent gas for this return is obtained from the compressor 52 via the conduit 54 with the valve 56. When the return conduit 48 of a container 36 is blocked, for example by the formation of sinter, the material in the container 36, which has a temperature of about 850° C., must be cooled before the material can be sucked out through a manhole and service personnel may enter the pressure vessel 14 and the container 36 to remove the blocking material in the conduit 48.

Cooling gas is supplied to the container 36 through nozzles 58 in the lower part of the container 36. To prevent combustion of any fuel existing in the bed material 46, an inert cooling gas, for example nitrogen gas, is suitably used. Nitrogen gas is supplied from the container 60 via the conduit 62 with the valve 64.

Figure 2:
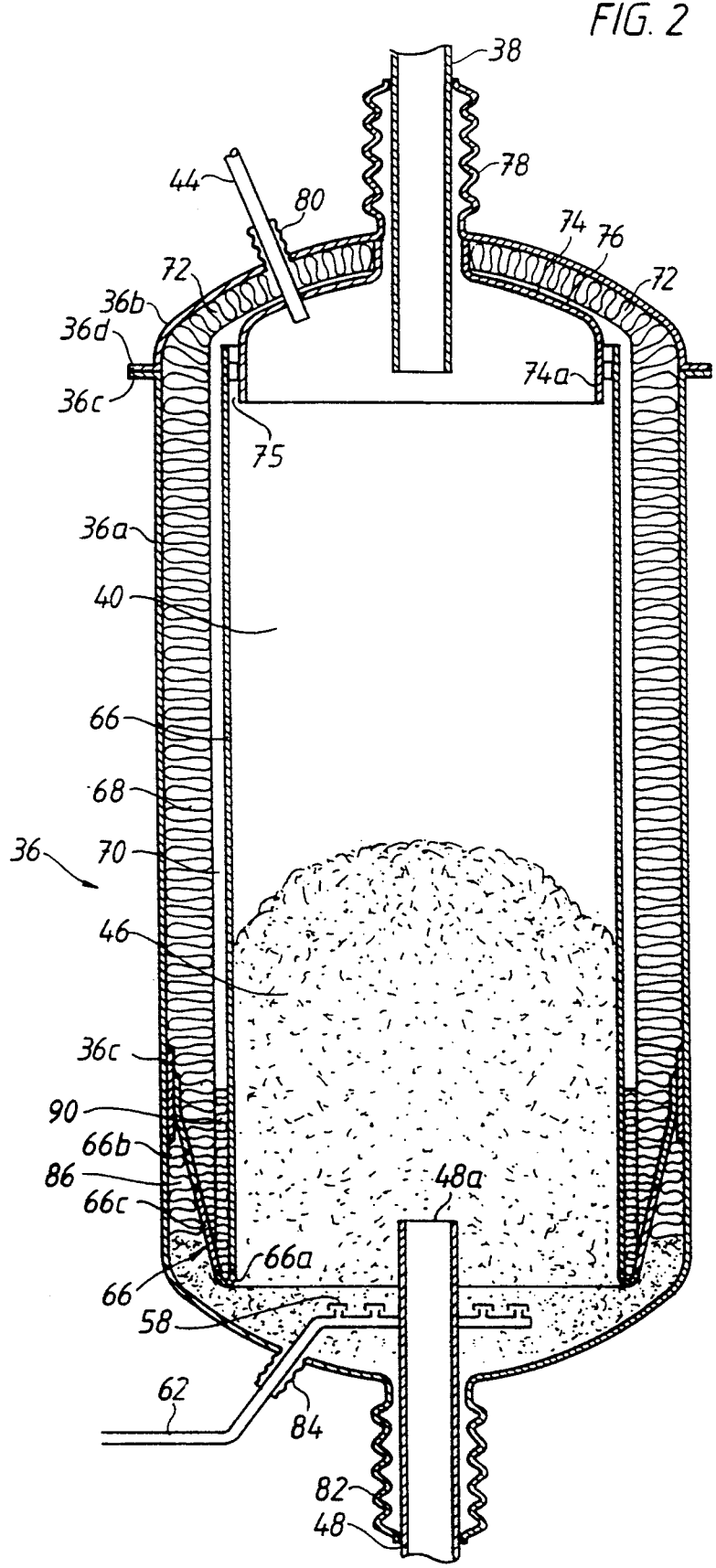
FIG. 2 a partially filled material container for storage of hot bed material.
Figure 3:
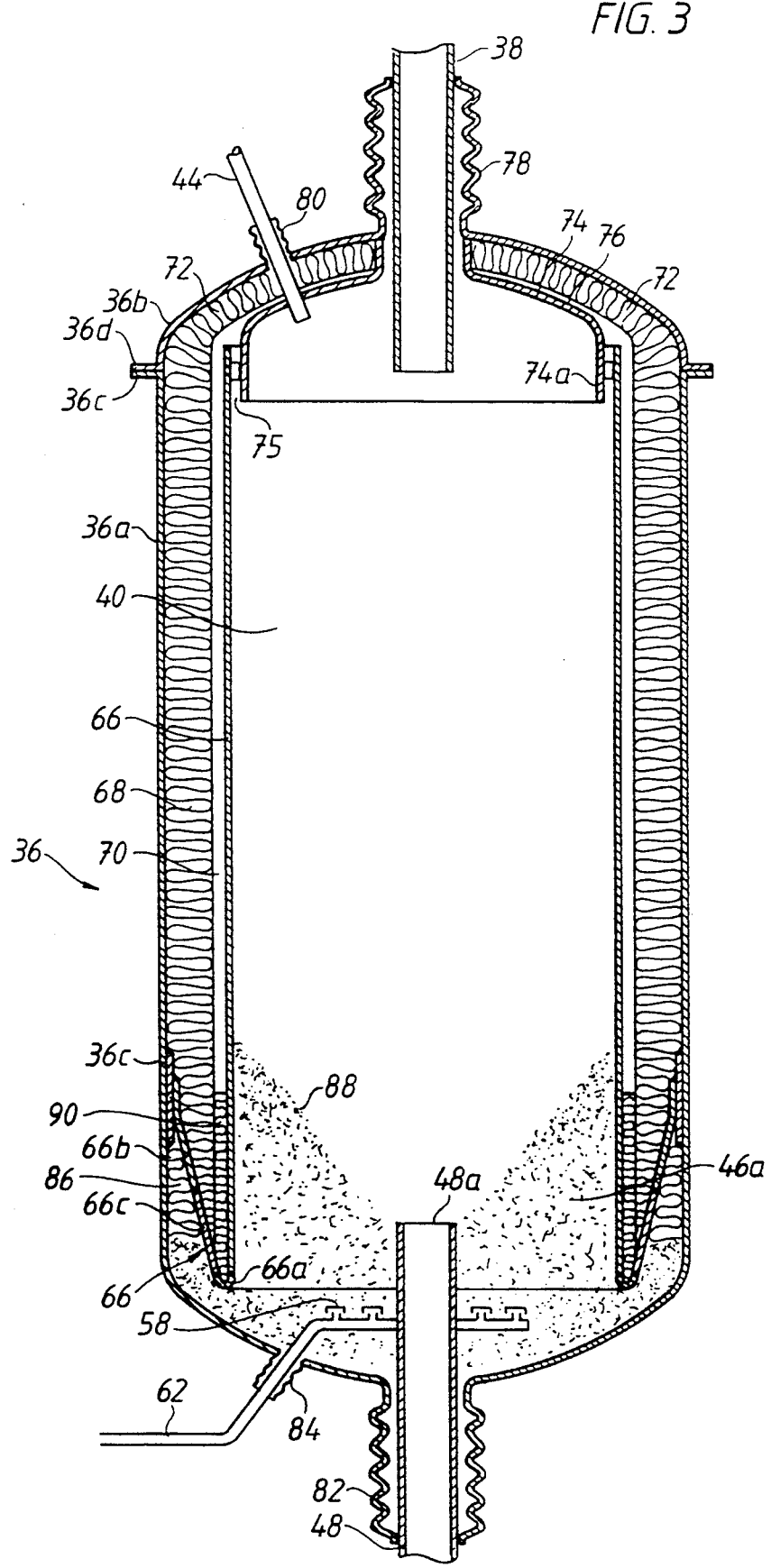
FIG. 3 an emptied material container.
Figure 4:
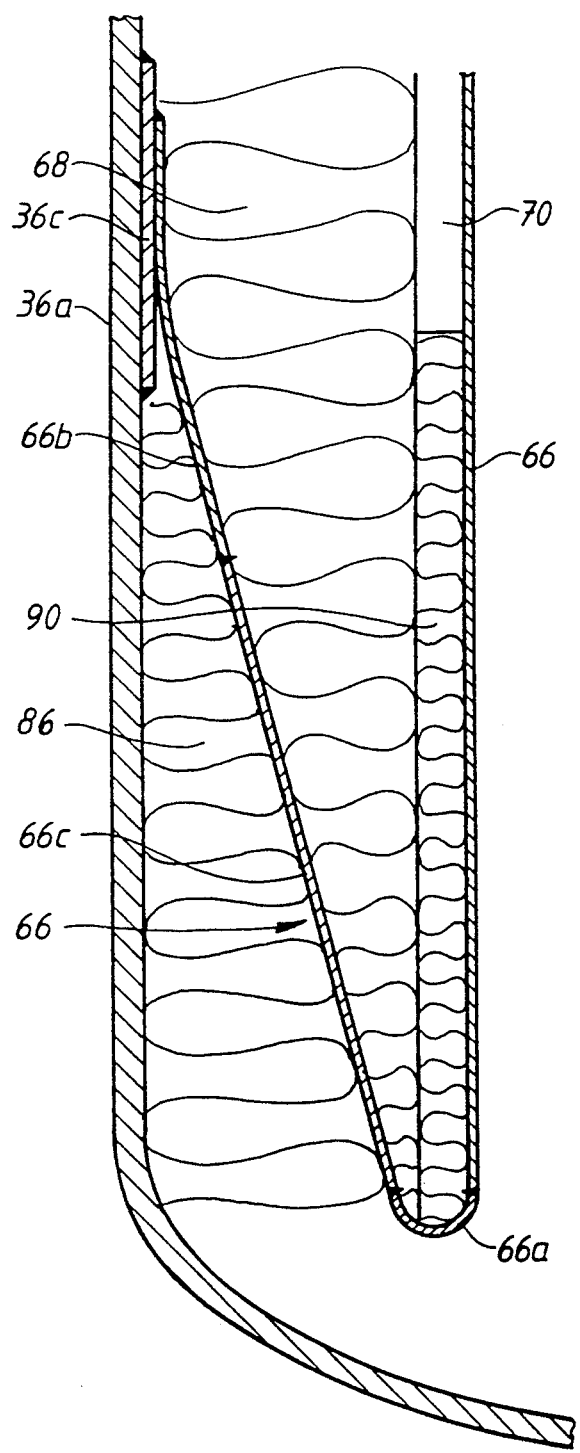
FIG. 4 the design of the lower part of an inner metal mantle in the container.

As is shown in FIGS. 2, 3 and 4, the storage container 36 is built up of a lower part 36a and an upper lid part 36b. These are joined together by means of the flanges 36c and 36d and a bolted joint (not shown). The lower container part 36a has an inner mantle 66 and an inner insulation 68 of a ceramic material, for example blocks of a material with the trademark designation Pyroblock ®. Between this insulation 68 and the mantle 66 there is a gap 70. However, in the lowermost part the entire space may be filled with insulating material. The upper container part, which is formed as a lid, is provided with an inner insulation 72 and a cover 74. Between the insulation 72 and the cover 74 there is a gap 76. The inner, lower part 74a of the cover 74 extends down in the mantle 66. Between the part 74a of the cover 74 and the mantle 66 there is a gap 75, through which the gaps 70 and 76 communicate with the space 40 so that no pressure differences may arise between the space 40 and the gaps 70 and 76. The supply conduit 38 and the gas conduit 44 are connected to the upper part 36b of the container by means of the bellows 78 and 80, respectively. The outlet conduit 48 and the cooling gas conduit 62 are connected to the bottom in the container part 36a by means of the bellows 82 and 84, respectively.

As mentioned above, the inner insulation 68 permits the outer part 36a, 36b of the container, which is subjected to great forces upon reduction of the pressure in the space 40, to be kept at a low temperature. It is cooled by the surrounding compressed combustion air and may be kept at a temperature of about 300° C. The necessary strength may be achieved with a simple and cheap sheet metal quality (carbon steel) and a moderate thickness of the material. The inner mantle 66, which protects the insulation and surrounds the bed material 46, assumes the same temperature as the hot bed material, 850–900° C. Because of the high temperature, the mantle 66 must be made of a heat-resistant material with good strength at this temperature to be able to absorb forces from the bed material 40.

The simple steel material in the outer wall of the container 36 and the high-temperature material in the inner mantle have different coefficients of thermal expansion, $\sim 13 \times 10^{-6}$ and $\sim 19 \times 10^{-6}/°$ C. This means that the diameter increases differently when the plant is put into operation and the temperature rises to $\sim 300°$ C. and 850° C., respectively. In case of diameters of 1300 mm and 1200 mm, respectively, the diameters increase $\sim 5$ and $\sim 19.5$ mm, respectively. This difference in diameter increase means that the gap 70 must be at least about 15 mm in order for the insulating material 70 not to be compressed between the inner mantle 66 and the wall of the storage container 36 and be damaged. A gas-tight connection between the lower part of the mantle 66 and the wall of the container 36 is necessary for several reasons. It is necessary in order to allow cooling gas to flow up through the bed material 46 in which the flow resistance is considerable. This flow resistance may give rise to a pressure drop of 0.2–0.3 bar. A leak between the lower part of the mantle 66 and the wall of the container 36 would mean that the cooling gas would find its way through this path instead of through the hot bed material. A gas flow through the untight part would also entail harmful temperature shocks for the container wall, the lower mantle part and joined-together welds. In addition, the gas transport would entail transport of bed material into the space between the mantle 66 and the wall of the container 36 with an ensuing risk of filling of the gap 70 with bed material and damage to the insulation 68. The gas-tight connection makes it possible to keep such a low temperature in the wall of the container 36 that carbon steel may be used as construction material.

To prevent the difference in expansion from causing dangerous stresses at the point of connection, the lower part of the mantle 66 is provided with an outwardly and upwardly directed skirt-like flange which is suitably composed of at least two but suitably three parts 66a, 66b, and 66c, respectively, of different materials. In the part 66a the same material can be used as in the cylindrical part of the mantle 66. In the upper part 66b a material is suitably used which has substantially the same properties from the point of view of thermal expansion as the material in the outer wall of the container 36. In the part 66c a material is suitably used which, from the point of view of thermal expansion, lies between the materials in the parts 66a and 66b. The upper flange part 66b may be joined to the outer wall of the container 36 either directly or via an intermediate sheet 36c by means of welding. By the insulation 68 and cold bed material at the lowermost part of the mantle 66, the temperature drops successively in the skirt-like flange 66a, 66c, 66b, which causes the stresses at the point of connection to be limited to permissible values. The gap 70 shall be so large that the mantle 66 is never pressed against the insulation 68. Using the previously mentioned dimensions of the container 36 and the mantle 66, a gap width of about 20 mm is suitable.

The outlet tube 48 suitably projects into the container 36 by such a distance that, when emptying the container 36, the remaining bed material 46a forms a funnel 88 which is dependent on the angle of repose. The orifice 48a of the tube 48 suitably lies at such a level that the outer part of the upper part of the funnel 88 will be at substantially the same level as the connection of the skirt-like portion 66b to the wall 36a of the container 36. This bed material forms an insulation against the lower part of the mantle 66 so as to obtain a temperature gradient between the hottest part of the mantle 66 and the wall of the container 36 which is advantageous from the stress point of view.

In the lower part of the container an insulation 86 is suitably provided between the skirt-like part 66b, 66c and the wall of the container 36. In the lowermost part of the gap 70 insulating material 90 may be provided between the insulation 68 and the mantle 66.

We claim:

1. A power plant with a combustor with a fluidized bed for combustion of a fuel supplied to the fluidized bed and with devices for adjusting the bed height in dependence of the operating conditions by the transfer of bed material between the combustor and a storage container with an outer casing of a first material, an inner cylindrical mantle of a second, high-temperature material, a ceramic insulation between the outer casing and the mantle, wherein the mantle is gas-tightly connected, at its lower end, to the wall of the container by means of an outwardly and upwardly directed skirt-like flange.

2. A power plant according to claim 1, wherein between the insulation and the mantle there is a gap.

3. A power plant according to claim 1, wherein the flange is composed of at least two parts, of which the part, which is connected to the mantle, is made of the same material as that of the mantle or of a material with a coefficient of thermal expansion of the same order of magnitude as that of the mantle material, and the part; which is connected to the outer wall of the container, is made of the same material as that of the outer wall or of a material with a coefficient of thermal expansion of the same order of magnitude as that of the material of the outer wall.

4. A power plant according to claim 3, wherein the flange comprises an intermediate part of a material with a coefficient of thermal expansion which lies between the coefficients of thermal expansion of the surrounding parts.

5. A power plant according to claim 4 wherein one or more containers is/are included in a PFBC power plant and is/are placed in a pressure vessel together with a combustor.

6. A power plant according to claim 1, wherein one of more containers is included in a PFBC power plant and is placed in a pressure vessel together with a combustor.

* * * * *